United States Patent [19]

Audett

[11] Patent Number: 5,135,816
[45] Date of Patent: Aug. 4, 1992

[54] RADIATION-REACTIVE PHENYLBUTADIENE MULTIBLOCK COPOLYMERS

[75] Inventor: Jay D. Audett, Brown Deer, Wis.

[73] Assignee: Exxon Chemical Patents Inc., Linden, N.J.

[21] Appl. No.: 763,093

[22] Filed: Sep. 20, 1991

Related U.S. Application Data

[62] Division of Ser. No. 589,139, Sep. 27, 1990, Pat. No. 5,066,728.

[51] Int. Cl.$^5$ .............................................. B32B 27/32
[52] U.S. Cl. .................................. 428/521; 156/334; 427/36; 427/44; 428/441; 428/462; 428/494; 428/512; 428/519
[58] Field of Search ............... 156/334; 427/44, 385.5, 427/208.4, 36; 522/149, 158; 525/314; 428/441, 462, 494, 512, 519, 521

[56] References Cited

U.S. PATENT DOCUMENTS 5,066,728  1/1991  Audett .............................. 525/314

*Primary Examiner*—Michael Lusignan
*Attorney, Agent, or Firm*—Catherine L. Bell; Myron B. Kurtzman

[57] ABSTRACT

A method for preparing a substrate coated or laminated with a multiblock copolymer comprising endblocks of phenylbutadiene and an elastomeric midblock of a conjugated diene such as isoprene or butadiene is disclosed. The copolymer is crosslinkable by EB radiation such that the crosslinks are confined primarily to the endblock domains in the polymer with minimal crosslinking occurring in the rubbery matrix. Also disclosed are blends of the copolymers with tackifier resins compatible with the midblock regions. The blends provide a curable PSA having enhanced cohesive strength while maintaining adhesive properties.

10 Claims, No Drawings

RADIATION-REACTIVE PHENYLBUTADIENE MULTIBLOCK COPOLYMERS

This is a division of application Ser. No. 589,139, filed Sep. 27, 1990, now U.S. Pat. No. 5,066,728.

FIELD OF THE INVENTION

The present invention relates to radiation-reactive multiblock copolymers having an elastomeric midblock and phenylbutadiene endblocks, and more particularly to such copolymers wherein radiation crosslinking may be selectively induced in the phenylbutadiene endblock phase.

BACKGROUND OF THE INVENTION

Multiblock copolymers having thermoplastic endblocks and an elastomeric midblock are well known from the prior art. Such block copolymers include, for example, polystyrene/polyisoprene/polystyrene (SIS) and polystryene/polybutadiene/polystyrene (SBS). Because these polymers exhibit both thermoplastic properties owing to the thermoplastic endblocks, as well as elastomeric properties due to the elastomeric internal block, these polymers have found a wide variety of commercial applications. One such commercial application employs the multiblock polymer in a blend with a tackifying resin for pressure sensitive adhesive (PSA) compositions. The composition is typically applied to a film, label, tape or other substrate to adhere the film, label, tape or substrate to yet another substrate in a laminated structure.

It is known that radiation-induced crosslinking of PSAs can be utilized to enhance cohesive strength, e.g. temperature performance. For example, the use of multifunctional acrylate monomer crosslinking agents is disclosed in U.S. Pat. No. 4,133,731 to St. Clair et al. However, the volatility and toxicity of such monomers present hazards and processing difficulties in the manufacturing process.

It is also known in the art to functionalize polymers to incorporate inherent radiation reactivity. However, such functionalization methods are typically multistep processes involving complex preparation techniques.

A major challenge in the design of radiation crosslinkable multiblock copolymers suitable for PSA applications is balancing cohesive and adhesive strength properties of the PSA after irradiation. Ordinarily, gains achieved in enhancing shear properties (cohesive strength) by introducing radiation-activated crosslinks is offset by sacrifices in peel and tack properties (adhesive strength). In St. Clair '731, for example, acrylate crosslinking agents are stated to partition between non-elastomeric endblocks and elastomeric midblocks in SIS and SBS triblock copolymers. Solubility factors favor preferential crosslinking by the acrylate monomers in the polystyrene blocks, however, reactivity considerations still favor crosslinking in the rubbery midblocks.

Further efforts involve the use of multifunctional acrylate monomers to crosslink triblock copolymers such as styrene/ethylene-1-butene/styrene (SEBS) block copolymers and block copolymers with a polydiene midblock. The elastomeric blocks are hydrogenated to reduce the occurrence of crosslinking in the rubbery matrix, as disclosed in U.S. Pat. Nos. 4,151,051 and 4,152,231 to St. Clair et al.

A further technique disclosed in U.S. Pat. No. 4,566,464 to St. Clair et al. involves the incorporation of unsaturation into the polystyrene blocks and the use of multifunctional acrylate monomer coupling agents. This is said to enable efficient crosslinking within the polystyrene domains, but the rubbery midblocks still contain relatively high levels of residual unsaturation so that crosslinking in this region has adverse effects on tack properties.

The radiation response of poly(2-phenylbutadiene) is disclosed in Yamaoka et al., "Primary Processes in the Radiation-Induced Crosslinking of Poly(2-Phenylbutadiene)", Polymer Journal, Vol. 19, No. 5, pp. 667–672 (1987). The polymer is stated to contain 88 weight percent of 1,4-units, 6 weight percent of 1,2-units and 6 percent of 3,4-units. The crosslinking is said to occur under gamma-radiation with a $G_{crosslink}$ (the number of crosslinks per 100 eV radiation energy absorbed) of 7.2. This high value was theorized to be due to benzyl cation and allyl radical intermediates, both of which lead to crosslinking.

SUMMARY OF THE INVENTION

It has been discovered that a block copolymer comprising endblocks of phenylbutadiene and an elastomeric midblock of a conjugated diene may be radiation crosslinked to give a block polymer having crosslinks confined primarily to the endblock domains. The use of phenylbutadiene as the endblock monomer solves a key problem present in the prior art, namely, preferential crosslinking of the endblocks without substantially crosslinking the elastomeric midblocks. Solubility parameter differences between uncured polyphenylbutadiene and polyisoprene or polybutadiene, for example, give discrete two-phase morphology. Subsequent radiation exposure preferentially crosslinks the polyphenylbutadiene phase because of substantially greater $G_{crosslink}$ of the polyphenylbutadiene compared to $G_{crosslink}$ of the elastomeric midblock. The present multiblock copolymer may be prepared in a single polymerization step and crosslinked without the use of crosslinking additives such as multifunctional acrylate and methacrylate monomers.

Broadly, the present invention provides a radiation-reactive multiblock copolymer, comprising endblocks comprising polymerized monomer of the formula:

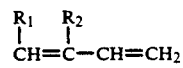

wherein at least one of $R_1$ and $R_2$ is phenyl or hydrocarbyl-substituted phenyl, and one of $R_1$ and $R_2$ can be hydrogen; and an elastomeric midblock of a conjugated diene. Preferably, the endblock has a weight average molecular weight ($M_w$) of from about 10,000 to about 20,000, and the midblock has a $M_w$ of from about 100,000 to about 150,000. The endblocks preferably comprise poly(2-phenylbutadiene) and the midblocks preferably comprise polyisoprene or polybutadiene.

In another embodiment of the present invention, a cured multiblock copolymer comprises the product obtained by exposing the multiblock copolymer to a quantity of radiation effective to form crosslinks in the endblocks. The copolymer preferably comprises endblocks of crosslinked poly(2-phenylbutadiene) and midblocks of polyisoprene or polybutadiene essentially free of crosslinking.

In a further embodiment, the present invention comprises an adhesive composition comprising the multiblock copolymer blended with a tackifying resin which is compatible with the midblock. The copolymer preferably comprises endblocks of poly(2-phenylbutadiene) and a midblock of polyisoprene or polybutadiene.

In yet another embodiment, the present invention includes a method of crosslinking the adhesive composition comprising the steps of coating at least a portion of a substrate with the adhesive composition and irradiating the coating with radiation sufficient to crosslink the endblock. The adhesive composition preferably comprises a multiblock copolymer having poly(2-phenylbutadiene) endblocks and polybutadiene or polyisoprene midblocks and blended with a tackifying resin which is compatible with the midblock.

DETAILED DESCRIPTION OF THE INVENTION

The radiation-reactive copolymer of the present invention is a multiblock copolymer generally of the formula A-B-A wherein A represents a non-elastomeric polymer endblock segment and B represents an elastomeric polymer midblock segment. The multiblock polymer may alternatively have a star block configuration and/or include several initiation, transition and termination blocks conventional in the art for multiblock copolymers. The molecular weight of the block copolymer generally ranges from about 60,000 to about 350,000, preferably from about 120,000 to about 250,000.

Endblocks comprise a block homopolymer or copolymer prepared from monomers having the general formula:

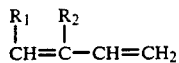

wherein at least one of $R_1$ and $R_2$ is phenyl or a hydrocarbyl-substituted phenyl, preferably phenyl or lower hydrocarbyl-substituted phenyl and one of $R_1$ and $R_2$ can be hydrogen. Examples include 2-phenylbutadiene, 1-phenylbutadiene, 2-(2,4-dimethylphenyl)butadiene, 2-(4-methylphenyl)butadiene, 2-(4-ethylphenyl)butadiene, and the like. A preferred monomer is 2-phenylbutadiene and for the purposes of illustration, 2-phenylbutadiene is referred to hereinafter with the understanding that other phenylbutadienes may be similarly employed. The endblocks may also include a relatively minor proportion of non-elastomeric monomers such as, for example, styrene, para-methylstyrene, t-butylstyrene, vinyl naphthalene and the like. Glass transition temperature ($T_g$) of the endblocks is generally greater than 0° C. usually in the range of about 0°–50° C. The molecular weight of each of the endblocks generally ranges from about 5000 to about 50,000, preferably from about 10,000 to about 20,000.

The elastomer midblock may be a homopolymer of a conjugated diene having up to about 12 carbon atoms, preferably from about 4 to about 8 carbon atoms, or a block copolymer of 2 or more such dienes. Examples of such midblock monomers include butadiene, isoprene, dimethylbutadiene, piperylene, butyloctadiene, and the like. $M_w$ of the elastomeric block generally ranges from about 50,000 to about 250,000, preferably from about 100,000 to about 150,000. $T_g$ of the midblocks is generally less than 0° C.

The block copolymers of the present invention are inherently radiation-reactive requiring no crosslinking additives. Solubility differences between poly(2-phenylbutadiene) endblocks and the midblock elastomer enables the formation of discrete two-phase morphology necessary for PSA formulations having enhanced performance. Surprisingly, the $G_{crosslink}$ value for poly(2-phenylbutadiene) is much greater than the $G_{crosslink}$ for isoprene and butadiene based rubbers, and therefore, crosslinking in the block copolymer occurs preferentially in the endblock phase. Such block copolymers can produce excellent PSAs which, upon radiation crosslinking, have enhanced cohesive strength and temperature performance without sacrificing adhesive properties.

In the practice of the present invention, a suitable tackifying resin compatible with the elastomeric midblock may be blended with the multiblock copolymer to obtain an adhesive formulation. Tackifying resins provide enhanced adhesive properties for use in adhesive compositions such as hot melts and pressure sensitive adhesives (PSAs). Tackifying resins are used to modify viscoelastic properties of the block copolymers, and to obtain the desired overall $T_g$ for the adhesive composition, depending on the type of application.

As suitable tackifiers, there may be mentioned terpene resins, aliphatic resins, and the like. Such tackifying resins may be used alone, or a combination of two or more tackifying resins may be used in the same blend. The tackifiers are selected for their ability to tackify the elastomeric block and compatibility therewith. Tackifiers compatible with polyisoprene include those derived from the copolymerization of diolefins, and especially $C_5$ diolefins such as piperylene with $C_5$ olefins such as 2-methyl-2-butene. These resins, such as ESCOREZ 1310LC and ESCOREZ 5280 available commercially from Exxon Chemical, have ring and ball softening points between 80° and 115° C. A tackifier compatible with polybutadiene includes WINGTACK 95 which is the tradename for a diene-olefin copolymer of piperylene and 2-methyl-2-butene having a softening point of 95° C. Another useful resin, ZONATAC 105 Lite, available from Arizona Chemicals, is prepared by the cationic polymerization of limonene and styrene. The tackifying resins are typically present at from 50 to 200 parts by weight per 100 parts of the block copolymer, preferably from 75 to 150 parts by weight.

Hydrocarbon extending oils can be employed in this application to modify the formulation viscosity and to increase the tackiness of the adhesive. The extending oils, referred to as paraffinic/naphthenic oils are fractions of refined petroleum products having less than 30 percent by weight aromatics and viscosities ranging from 100 to 500 SSU at 100° F. Such oils are readily commercially available, such as SHELLFLEX 371, a naphthenic oil manufactured by Shell.

The blend may further contain conventional additives such as, for example, stabilizers, dyes, pigments, fillers and the like, but the blend should be free of other additives and impurities in amounts which adversely affect the adhesive properties of the blend, and particularly the high temperature adhesive properties thereof.

The endblock monomer 2-phenylbutadiene, for example, may be synthesized from a corresponding alcohol obtained by a Prins reaction of α-methylstyrene or by the Grignard reaction of acetophenone.

Preparation of the multiblock copolymer is by anionic polymerization methods well known in the art. Polymerization proceeds by the successive additions of monomer to be polymerized in order of incorporation into the polymer. Further control over the polymer composition molecular weight distribution and architecture may be gained by utilizing a linking agent to link together two different "living" polymer chain centers comprising, for example, an end and midblock section, i.e. A-B-B-A. In this manner, geometric architecture other than linear polymers, such as star-shaped polymers, are possible. Linear polymers are joined in this process, for example, by dichlorodialkylsilane compounds, or any silane compounds having two reactive moieties attached to the silicon atom. Star-shaped polymers may be prepared by utilizing tri- or tetra-halide substituted silane compounds and the like. In the first sequence, endblock monomer is added to a suitable solvent medium containing the initiating reagents. Next midblock monomer is added, followed by other additional endblock monomer or a silane linking agent.

Polymerization conditions are employed which are typical for anionic polymerization. Initiators may also be selected from initiators commonly employed in anionic polymerization methods. Generally, these are organometallic compounds derived from alkali metals. The preferred alkali metal compounds are organolithium compounds. n-Butyl lithium is especially preferred. The amount of initiator used is generally based on the amount of monomer used to form the first sequence and may vary widely depending on the type of initiator and type of monomer. Generally, however, about 0.1 to about 100 millimoles of initiator per hundred grams of monomer is required.

The polymerization process is generally conducted in an organic solvent. Both polar and nonpolar solvents are suitable, such as ethylene dichloride or benzene.

Polymerization temperature depends on initiator, monomer and solvent selection with the overall intent to maintain the "living" character of the chain center and retard side reactions which will broaden the molecular weight distribution and reduce molecular weight. Generally, the polymerization can be undertaken from about $-100°$ C. to about 100° C. Typically the polymerization is carried out under sufficient pressure to maintain the monomers in a liquid phase. Polymerization conventionally proceeds under an inert atmosphere.

Generally, the "living" block copolymers are deactivated at the end of polymerization by conventional means such as the addition of an alcohol or carboxylic acid. Also, as mentioned previously, deactivation may be accomplished by the coupling of a "living" chain center with a coupling agent such as a disubstituted halo-silane or similar reactive compound. Thereafter the multiblock copolymer is filtered, recovered and dried under vacuum. Polymerization may be conducted in any suitable vessel.

The adhesive compositions of the present invention may be prepared by any method which results in intimate admixture of the components. Preferably, a blend is prepared by dissolving the components in a solvent such as toluene and/or mixing solutions of the components, followed by evaporation of the solvent(s). Alternatively, dry mixing, such as, for example, on a mill, may also be employed, but this will generally require heating the components and/or the mill to obtain a suitable degree of intimate admixture.

The adhesive compositions can be employed by applying a solution or hot melt of the composition to a substrate using equipment conventional in the art. A solution of up to about 40 weight percent solids in a solvent such as toluene is prepared and the solvent is removed by evaporation. Alternatively, the ingredients may be mixed in a solvent, the solvent evaporated to form an aqueous emulsion and the adhesive may be applied to the substrate as a 50-60 weight percent solids water-based emulsion, the water being removed by subsequent evaporation.

The adhesive may be applied as a hot melt where the formulated block copolymer has a relatively low processing viscosity, e.g. less than several hundred thousand centipoise at processing temperatures of up to about 150° C. The copolymer as a hot melt adhesive may be supplied to a substrate surface by the use of an extruder to feed a coating die.

Suitable substrates include, for example, plastics, metals, wood, paper, rubber, glass, fabrics such as carpet and canvas and the like. The above-described adhesive composition is generally deposited in adhesive contact with at least one surface of a substrate to form a structure. For example, laminates may be formed by bonding opposed surfaces of substrates with the above-described adhesive blend.

A preferred use of the present invention is the preparation of pressure sensitive adhesive tapes or labels comprising a tape or label substrate having at least one surface to which the above-described adhesive composition is applied wherein the adhesive composition is tacky at room temperature. The pressure-sensitive adhesive tape comprises a flexible backing sheet and a layer of adhesive composition of the novel PSA compound coated on one major surface of the backing sheet. The backing sheet may be a plastic film, paper or any other suitable material and the tape may include various other layers or coatings, such as primers, release coatings and the like, which are used in the manufacture of pressure-sensitive tapes. According to the "Glossary of Terms Used in the Pressure Sensitive Tape Industry", a pressure sensitive adhesive is a material which is aggressively and permanently tacky, adheres without the need of much more than finger pressure, exerts a strong holding force, and has sufficient cohesiveness and elasticity that it can be removed from substrates without leaving a residue. A hot melt adhesive, on the other hand, is a 100 percent nonvolatile thermoplastic material that is heated to a melt and applied to the substrate as a liquid. The hot melt bond forms after the liquid cools and solidifies. Some pressure sensitive adhesives, such as those based on block copolymers, are applied as hot melts, and are referred to as hot melt-pressure sensitive adhesives.

The adhesive compositions of the present invention can be cured by exposure to high energy electromagnetic radiation such as electron beam radiation or gamma radiation. Sources of such radiation include an atomic pile, a resonant transformer accelerator, a Van de Graff electron accelerator, a Linac electron accelerator, a betatron, a synchrotron, a cyclotron, or the like. Radiation from these sources will produce ionizing radiation such as electrons, protons, neutrons, deuterons, gamma rays, X-rays, $\alpha$-particles and $\beta$-particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent air inhibition of the crosslinking reaction and to prevent oxidative degradation of the polymer. The amount and kind of radiation required depends primarily on the level of curing desired. Generally, the radiation dosage should be effective to crosslink the phenyl-butadiene endblocks, but should not be excessive such that the midblocks remain essentially free of crosslinking to the extent that adhesive properties (e.g. tack and peel) are not substantially adversely affected. Suitable doses of EB or gamma radiation are from about 0.2 megarad to about 20 megarad, preferably from about 1 megarad to about 10 megarad.

The invention is illustrated by way of the following examples.

EXAMPLE 1

Poly(2-phenylbutadiene-isoprene-2-phenylbutadiene) multiblock copolymer (PIP) is prepared by the anionic polymerization of monomers sequentially added so that the molecular weight of the endblocks is in a range from about 10,000 to about 20,000 and the midblock molecular weight ranges from about 100,000 to about 150,000. Prior to polymerization, the following purification steps are carried out:

1. 2-Phenylbutadiene monomer is prepared by the dehydration of the alcohol obtained by the Prins reaction of α-methylstyrene (or by the Grignard reaction of acetophenone), and then vacuum distilled prior to use.
2. Benzene and isoprene are refluxed with metallic sodium, potassium and benzophenone to purify, then distilled prior to use.
3. 1,1-Diphenylethylene co-initiator is distilled prior to use.

In a sealed reaction vessel under constant stirring and a nitrogen atmosphere, purified benzene 1,1-diphenylethylene and n-butyllithium are sequentially added by syringe. The solution is dark red in color. After five minutes, an initial quantity of 2-phenylbutadiene is injected into the reaction vessel and allowed to react overnight at room temperature. A quantity of purified isoprene is added and the polymerization proceeds for 24 hours. A final addition of 2-phenylbutadiene is made and polymerization conducted for another 24 hours followed by termination with methanol. Following precipitation from excess pentane, filtration and vacuum drying, a polymer is obtained having poly(2-phenylbutadiene) endblocks of $M_w$ 10,000–20,000 and a polyisoprene midblock of $M_w$ 100,000–150,000.

EXAMPLE 2

In this example, a poly(2-phenylbutadiene-butadiene-2-phenylbutadiene) (PBP) multiblock copolymer is prepared as in Example 1, except that butadiene is used in place of the isoprene.

EXAMPLES 3 and 4

Adhesive compositions are prepared using the block copolymers of Examples 1 and 2. The PIP copolymer (Example 1) is blened with 100 phr of ESCOREZ 1310LC which is compatible with the polyisoprene midblock. The PBP copolymer (Example 2) is blended with 100 phr of WINGTACK 95 tackifier which is compatible with the polybutadiene midblock. The resulting adhesive formulations are dissolved in toluene and knife coated on MYLAR substrates and the solvent is allowed to evaporate to produce PSA coatings. Following crosslinking with EB radiation, PSA tests are performed to determine the cohesive (shear adhesion failure temperature and holding power) and adhesive (rolling ball tack and peel) strength properties. Cohesive properties are found to be enhanced while maintaining good adhesive properties.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A method for preparing a substrate coated with a cured multiblock copolymer coating, comprising the steps of:
   (A) coating at least a portion of a substrate with a multiblock copolymer comprising:
   (1) endblocks comprising the polymerized monomer of the formula;

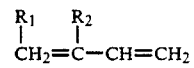

wherein at least one of the $R_1$ and $R_2$ is phenyl or hyrocarbyl-substituted phenyl, and one of $R_1$ and $R_2$ can be a hydrogen; and
   (2) an elastomeric mid block of a conjugated diene; and (B) irradiating said coating with a radiation sufficient to cross link said end blocks.

2. The method of claim 1, wherein said irradiation step comprises exposing said coating to from about 0.2 to about 20 megarads of electron beam or gamma radiation.

3. The method of claim 1, wherein said exposure is from about 1 to about 10 megarads.

4. The method of claim 1, wherein said multiblock copolymer in said coating step is blended with a tackifier compatible with said midblock.

5. The method of claim 4, wherein said blend in said coating step comprises said multiblock copolymer and said tackifier in a solvent.

6. The method of claim 4, wherein said blend in said coating step comprises the multiblock copolymer and the tackifier in an emulsion.

7. The method of claim 4, wherein said blend in said coating step comprises the multiblock copolymer and the tackifier in a hot melt.

8. A coated article comprising:
a substrate coated with a cured multiblock copolymer comprising:
   (1) end blocks comprising polymerized monomer of the formula;

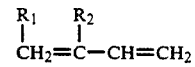

wherein at least one of $R_1$ and $R_2$ is phenyl or hydrocarbyl-substituted phenyl and one of $R_1$ and $R_2$ can be hydrogen; and (2) an elastomeric mid block of a conjugated diene.

9. A laminate, comprising:
first and second substrates having opposed surfaces in adhesive contact with an interposed layer of a cured multiblock copolymer comprising:
   (1) endblocks comprising polymerized monomer of the formula:

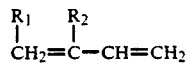
wherein at least one of $R_1$ and $R_2$ is phenyl or hydrocarbyl-substituted phenyl and one of $R_1$ and $R_2$ can be hydrogen; and
(2) an elastomeric mid block of a conjugated diene.
10. The laminate of claim 9, wherein the interposed layer comprises a tackifier blended with said copolymer.
* * * * *